(12) United States Patent
Arnett et al.

(10) Patent No.: US 8,333,161 B2
(45) Date of Patent: Dec. 18, 2012

(54) SEED FURROW CLOSING APPARATUS

(75) Inventors: Gregory W. Arnett, Solomon, KS (US);
Thomas J. Evans, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 294 days.

(21) Appl. No.: 12/649,726

(22) Filed: Dec. 30, 2009

(65) Prior Publication Data
US 2011/0155031 A1    Jun. 30, 2011

(51) Int. Cl.
*A01C 5/00* (2006.01)
*A01C 13/00* (2006.01)

(52) U.S. Cl. .......................... 111/193; 111/195

(58) Field of Classification Search ........... 111/190–196
See application file for complete search history.

(56) References Cited

U.S. PATENT DOCUMENTS

| | | |
|---|---|---|
| 3,742,877 A | 7/1973 | Coffee |
| 5,190,112 A | 3/1993 | Johnston et al. |
| 5,443,023 A | 8/1995 | Carroll |
| 5,497,717 A | 3/1996 | Martin |
| 5,611,291 A | 3/1997 | Pogue |
| 5,645,000 A | 7/1997 | Carroll |
| D382,571 S | 8/1997 | Bruns |
| D395,662 S | 6/1998 | Bruns |
| 5,896,932 A | 4/1999 | Bruns et al. |
| 5,970,891 A | 10/1999 | Schlagel |
| D421,026 S | 2/2000 | Bruns et al. |
| 6,067,918 A | 5/2000 | Kirby |
| 6,119,608 A | 9/2000 | Peterson et al. |
| 6,314,897 B1 | 11/2001 | Hagny |
| 6,530,334 B2 | 3/2003 | Hagny |
| 6,907,833 B2 | 6/2005 | Thompson et al. |
| 7,240,627 B1 | 7/2007 | Whalen et al. |
| 2007/0131153 A1 | 6/2007 | Whalen et al. |
| 2009/0056962 A1 | 3/2009 | Martin et al. |

OTHER PUBLICATIONS

Martin Spading—Closing Wheels, Step 4: Close without surface compaction; 2007; pp. 18-25; Martin Industries, LLC, Elkton, KY.
6200-102 Close-Till System, The Answer to Closing the Seed Trench in Damp Conditions; http://www.yetterco.com; Mar. 11, 2009; Yetter Manufacturing Inc.; Colchester, IL.
Curvetine XR and Curvetine II Closing Wheels; http://www.dawnequipment.com; Mar. 11, 2009; Dawn Equipment Company; Sycamore, IL.
Posi Close Planter Wheels; http://www.schlagel.net; Mar. 11, 2009; Schlagel Manufacturing; Torrington, WY.
Schlagel Built by Farmers for Farmers; http://www.schlagel.net; Mar. 11, 2009; Schlagel Manufacturing; Torrington, WY.

*Primary Examiner* — Christopher J. Novosad
(74) *Attorney, Agent, or Firm* — Hovey Williams LLP

(57) ABSTRACT

A seed furrow closing wheel has a generally dish-shaped body defined by a central portion and a notched outer flange portion that circumscribes the central portion and projects obliquely outwardly from the plane thereof. The notched flange portion is configured to present a series of circumferentially spaced, non-radial, obliquely projecting teeth that function to fragment and squeeze together opposite sidewalls of the seed furrow when a pair of the wheels are rolled along opposite sides of the furrow outboard of the furrow itself, crumbling the sidewalls and covering the seeds.

17 Claims, 12 Drawing Sheets

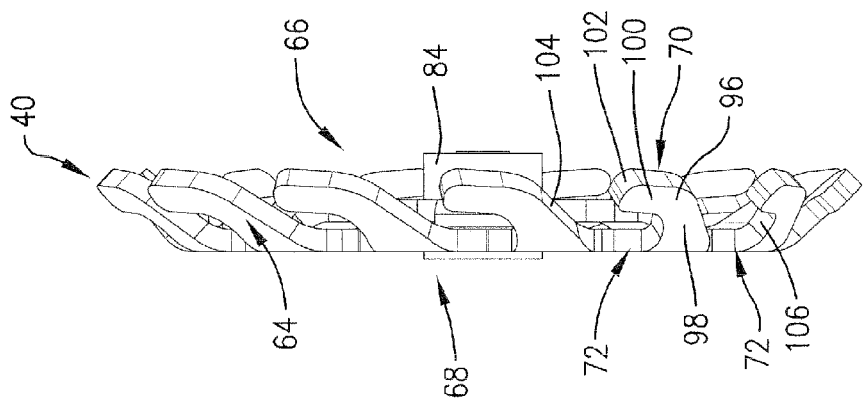
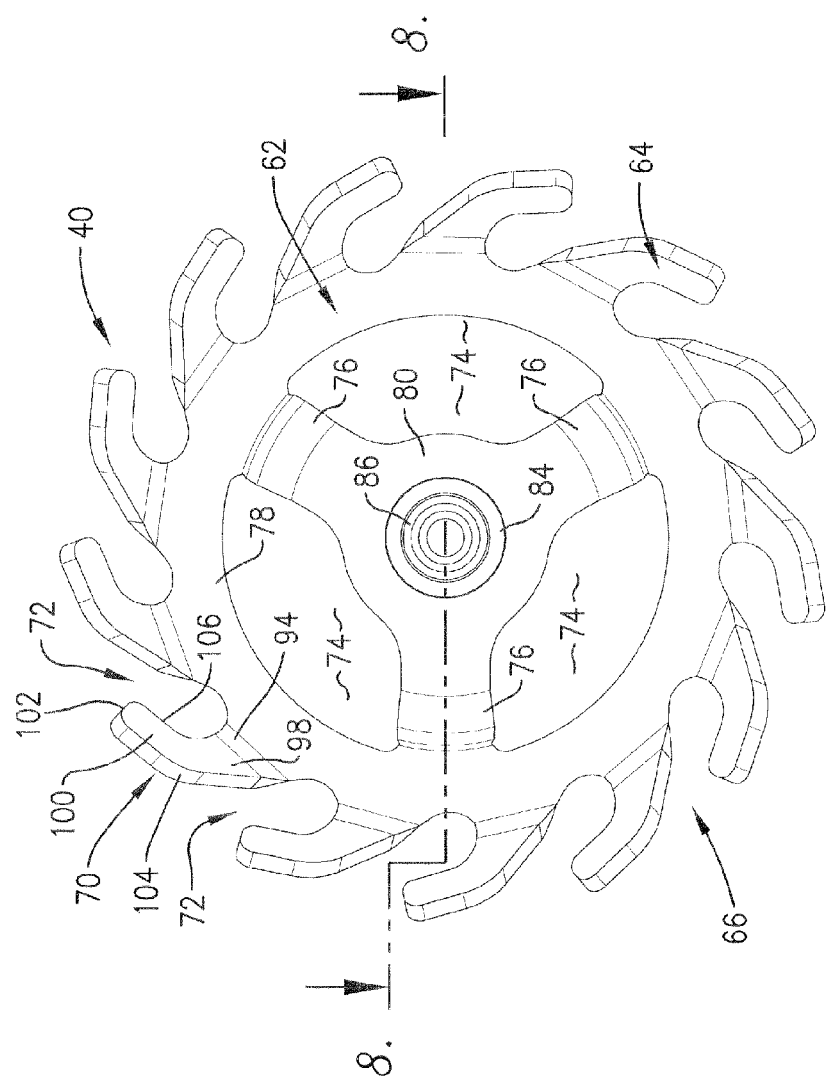

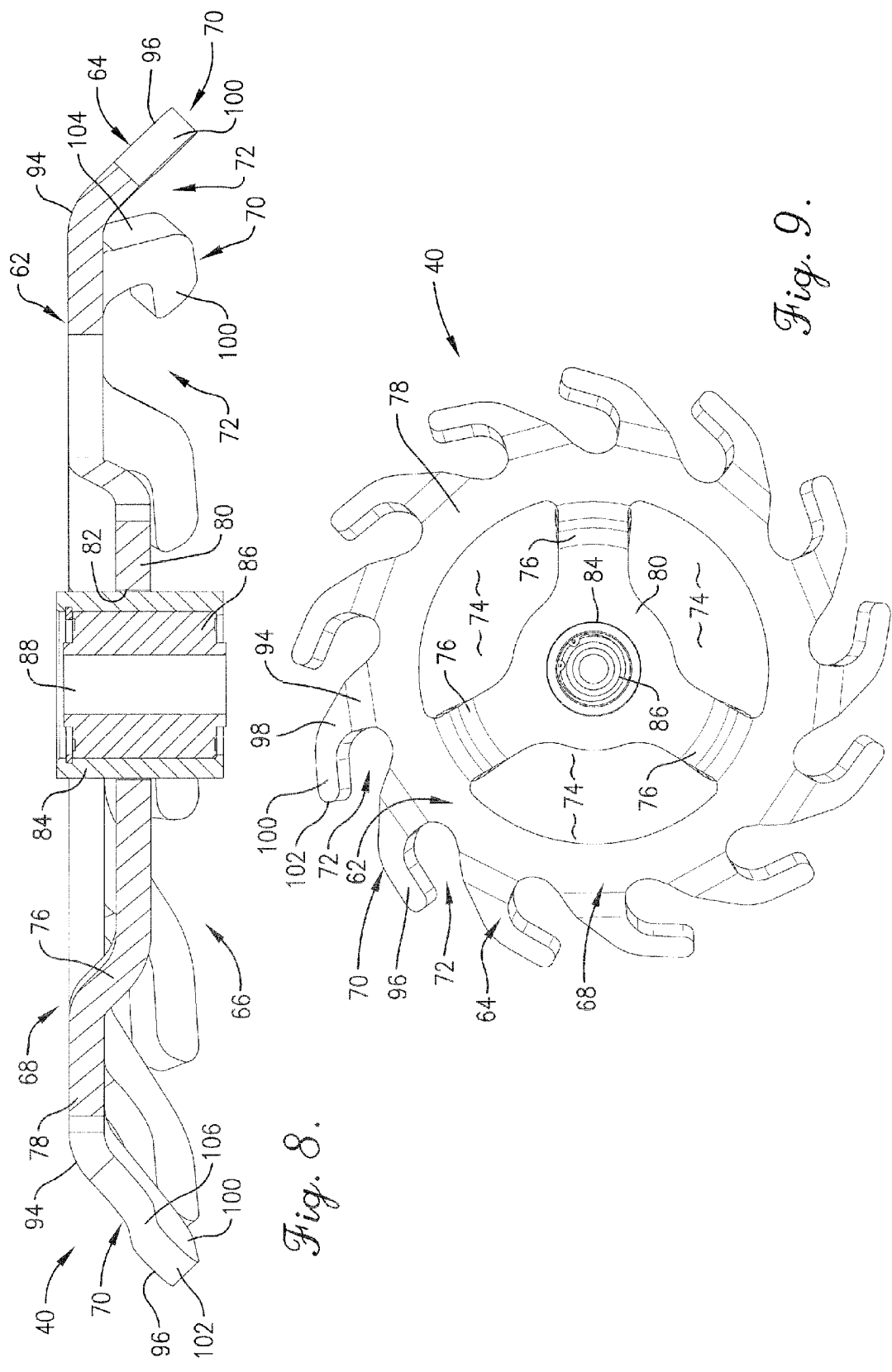

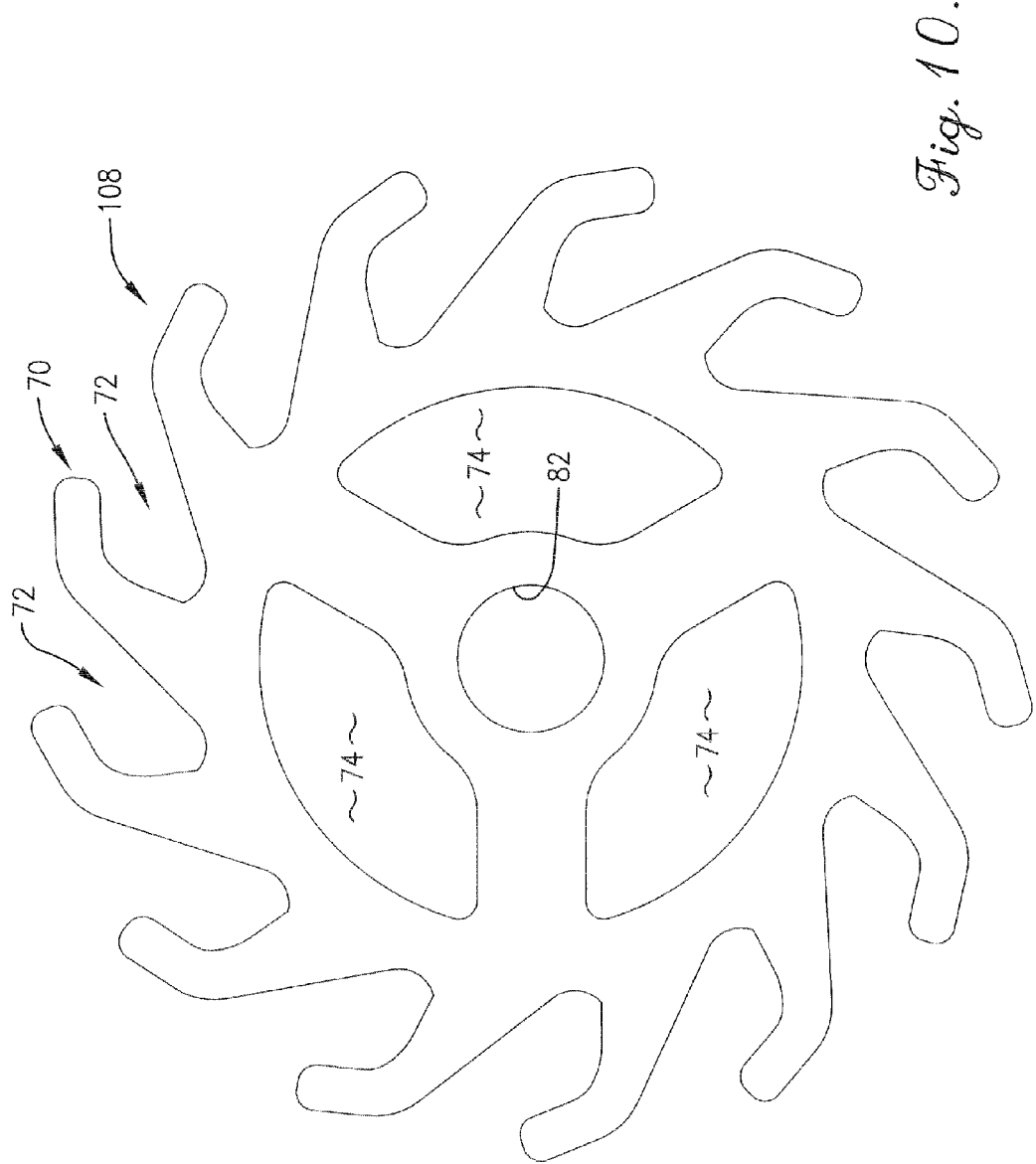

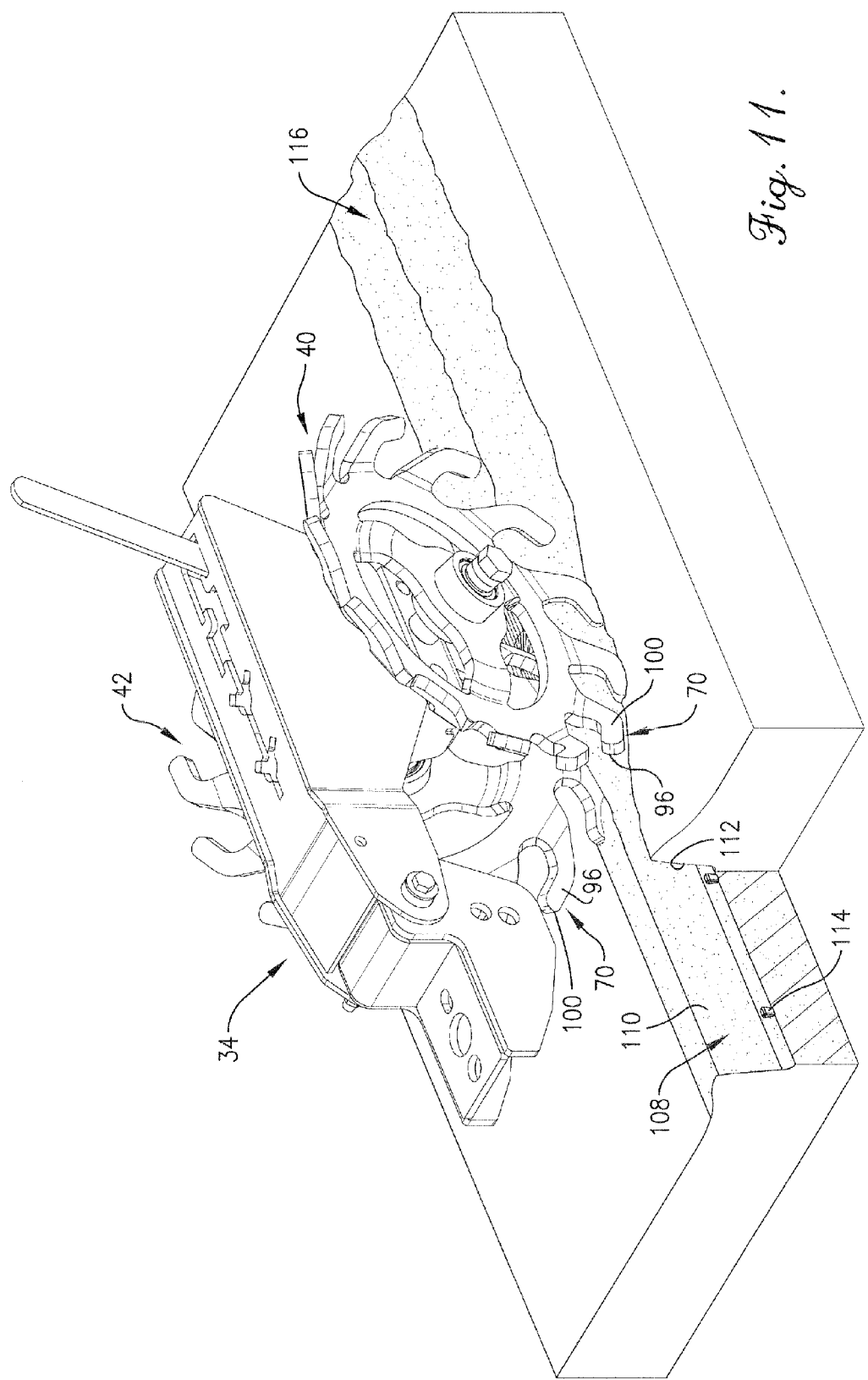

SEED FURROW CLOSING APPARATUS

TECHNICAL FIELD

The present invention relates to seed planting equipment and, more particularly, to an improved design for the closing wheels of a planting machine that close the seed furrow and cover the seeds behind openers that deposit the seeds into the furrow.

BACKGROUND AND SUMMARY

Many different types of seed closing wheels are presently commercially available, some of which are especially designed to handle particular kinds of soil conditions. Some conventional wheels are designed to apply converging pressure outside the sidewalls of the seed furrow so as to push or squeeze the sidewalls together, essentially "sandwiching" the seeds between opposite faces of the sidewalls. However, in high moisture situations this can be problematic because as the soil dries out, it tends to contract, sometimes causing the slit between the two sidewalls to open up and expose the seeds.

More recently, closing wheels with radially extending spikes have been utilized in an effort to break down the sidewalls of the furrow and crumble the soil so that there is less of a defined slit in the soil that is subject to opening up as the soil dries out. However, spiked closing wheels present their own unique problems, including some tendency to be overly aggressive and penetrate the soil too deeply in certain conditions, disturbing and sometimes dislodging the seeds as the teeth lift out of the soil at the rear of the wheels. Another problem is that substantial gaps are typically presented between the spikes around the wheel such that the spikes themselves only intermittently engage the soil, perhaps where no seed is located. This can result in improper or incomplete covering of the seeds, which leads to uneven emergence and lost yield.

The present invention is directed to a closing wheel that achieves a highly desirable fragmentizing of the seed furrow sidewalls above the seeds and squeezing together of the sidewalls around the seeds without disturbing the seeds themselves, thus avoiding the disadvantages of current spiked tooth wheels and other conventional designs. Among other things, the closing wheel of the present invention is also designed to be more effectively usable in a wider variety of field conditions than in the past, thereby enabling the farmer to run the same wheel in almost all conditions and avoiding the time-consuming and laborious task of changing out all the wheels on the machine to match the particular field conditions at hand.

BRIEF DESCRIPTION OF THE DRAWINGS

FIG. 6 is a plan view of the front side of a closing wheel in accordance with the present invention;

FIG. 7 is a front elevational view of the wheel;

FIG. 8 is an enlarged cross-sectional view through the wheel taken substantially along line 8-8 of FIG. 6;

FIG. 9 is a plan view of the back side of the wheel of FIG. 6;

FIG. 10 is a plan view of a wheel blank from which closing wheels in accordance with the present invention may be formed, prior to the blank being pressed and formed into a generally dish-shaped configuration;

FIG. 11 is a front perspective view of the closing unit in operation, illustrating the manner in which the closing wheels cooperate to fragment and close a seed furrow;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The closing wheels of the present invention have been illustrated in connection with a planter having a particular type of furrow-forming opener and gauge wheels associated therewith. However, it is to be understood that the principles of the present invention are not limited to use with any particular type of planter and may in fact be utilized with seed drills of various kinds and constructions. Thus, the particular type of machine with which the closing wheels of the present invention have been illustrated is by way of example only.

Figure 1:
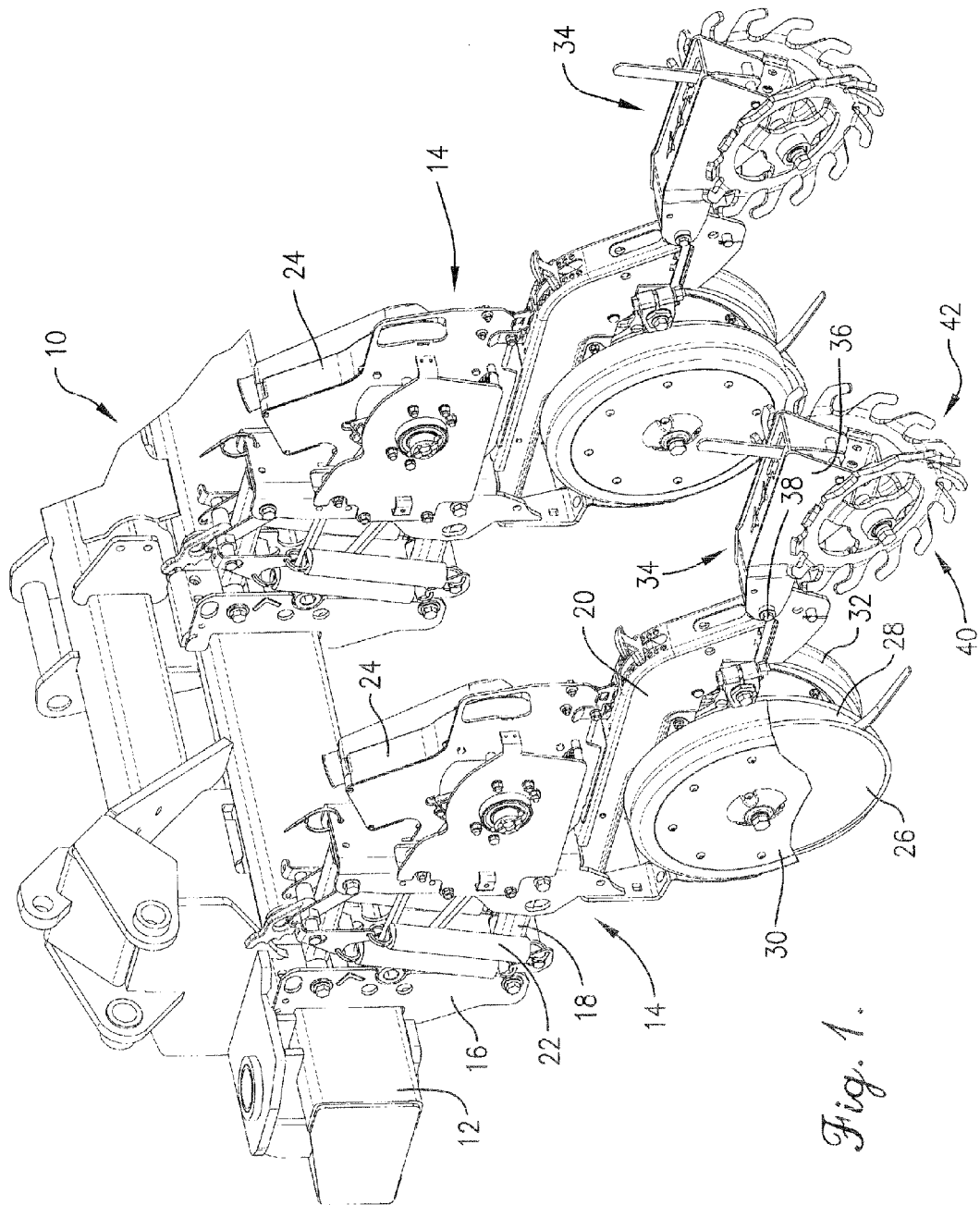
FIG. 1 is a fragmentary, left, rear perspective view of an exemplary seed planting machine utilizing closing wheels constructed and arranged in accordance with the principles of the present invention.
Figure 2:
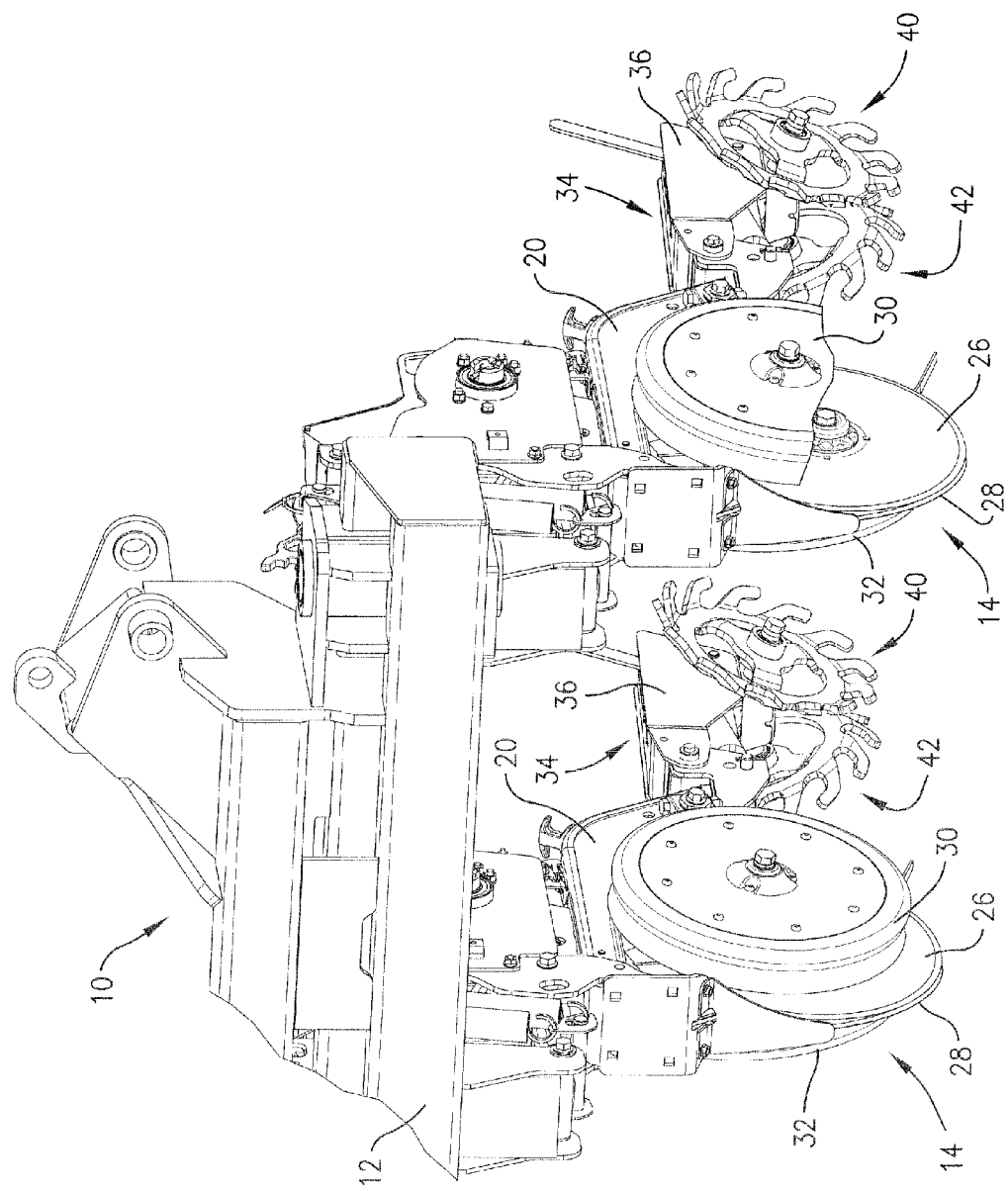
FIG. 2 is a fragmentary, front perspective view of the left side of the seed planting machine of FIG. 1, parts being broken away to reveal details of construction.

The planting machine 10 illustrated in FIGS. 1 and 2 has a generally horizontally extending toolbar 12 to which are attached a number of individual row units 14 at spaced locations along toolbar 12 (only two of such row units 14 being illustrated). As machine 10 advances across a field, each row unit 14 is adapted to open a seed furrow in the ground, deposit a row of seeds in the furrow, and close the furrow to bury the seeds.

In the illustrated embodiment, each row unit 14 includes a mounting bracket 16 fixed to toolbar 12, a four-bar linkage 18 pivoted to bracket 16 and projecting rearwardly therefrom, and a mainframe 20 pivotally attached to the rear end of linkage 18. Thus, mainframe 20 is adapted for up and down movement relative to toolbar 12, with down pressure being supplied by springs 22, for example.

Each row unit 14 further includes a seed meter 24 which has the function of receiving a supply of seeds and singulating them for deposit one at-a-time into a seed furrow formed by row unit 14. In the illustrated embodiment, meters 24 are designed to receive seeds from a bulk source of supply (not shown) although they could just as easily be designed to receive seeds from individual, overhead seed boxes associated with each row unit.

Each row unit 14 also includes an opener mounted on mainframe 20 and adapted to produce a fore-and-aft seed furrow in the soil as machine 10 is moved along the grounds. In the illustrated embodiment, such opener is a double-disc opener having a pair of cooperating discs 26 and 28 that rotate about generally horizontally disposed, transverse axes and which are inclined downwardly and inwardly toward one another as their lower extremities are approached for the purpose of cutting a generally V-shaped furrow in the soil. A pair of gauge wheels 30 and 32 are also rotatably supported by mainframe 20 on opposite sides of discs 26, 28 for the purpose of maintaining the desired operating depth for discs 26, 28.

Figure 3:
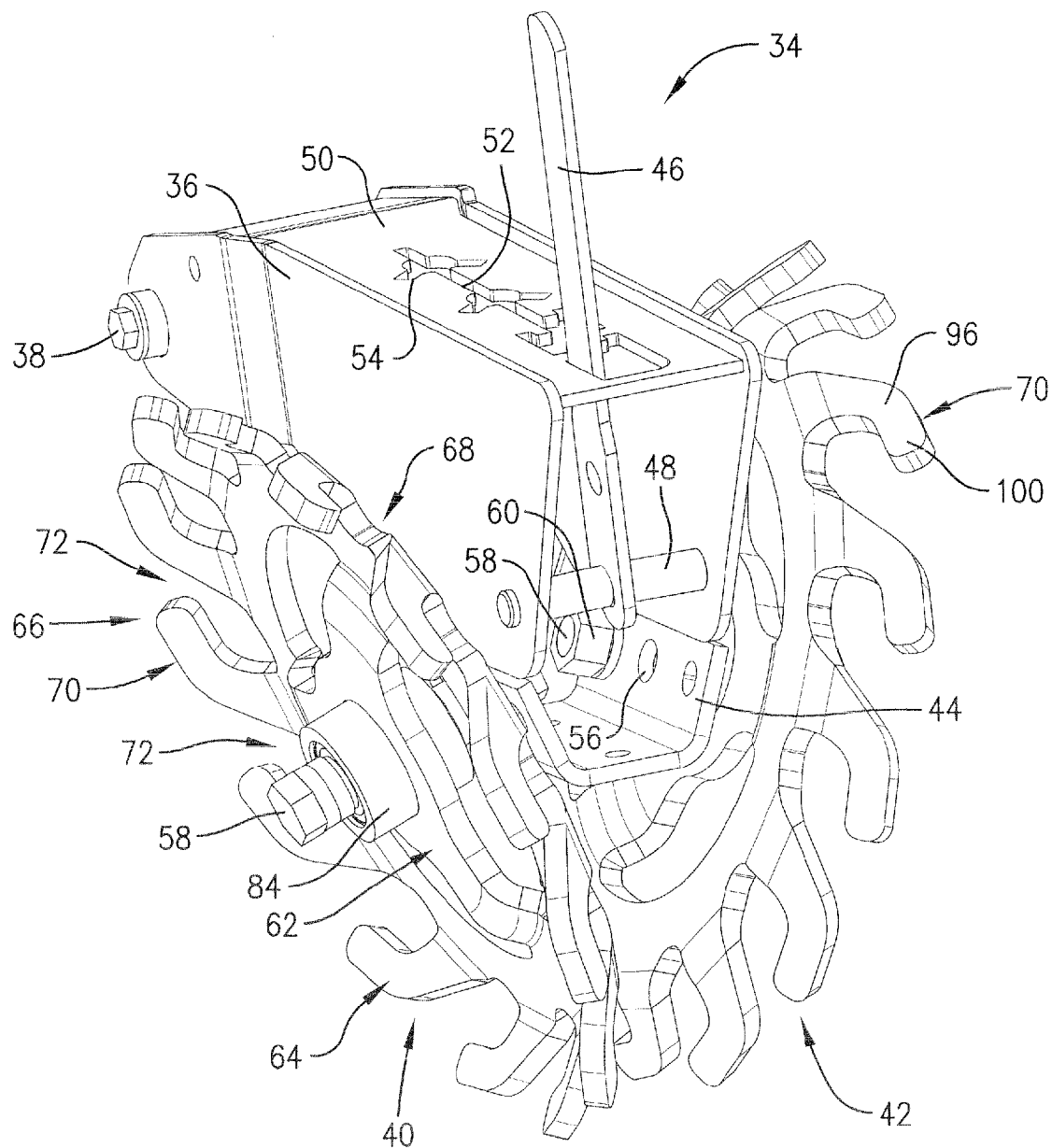
FIG. 3 is an enlarged, left, rear perspective view of one closing apparatus of the machine.

Each row unit 14 further includes furrow closing apparatus broadly denoted by the numeral 34 and attached to the rear end of mainframe 20. Each closing apparatus 34 comprises a fore-and-aft extending box frame 36 pivotally attached at its front end to mainframe 20 by a transverse pivot bolt 38. Apparatus 34 also includes a pair of left and right closing wheels 40, 42 that are rotatively supported on box frame 36 by a fore-and-aft support channel 44 (FIGS. 3-5) disposed generally below and rigidly affixed to box frame 36. A lever 46 is pivotally attached to the rear of box frame 36 by a transverse pivot 48 and is connected by a tension spring (not shown) to the rear end of main frame 20 to apply spring-loaded down pressure to closing apparatus 34. Such down pressure can be adjusted by adjusting the fore-and-aft position of lever 46 relative to box frame 36. A top wall 50 of box frame 36 is provided with a fore-and-aft slot 52 and intersecting side notches 54 for the purpose of permitting fore-and-aft adjustable swinging of lever 46 and releasable retension thereof in any selected one of the notches 54.

Figure 4:
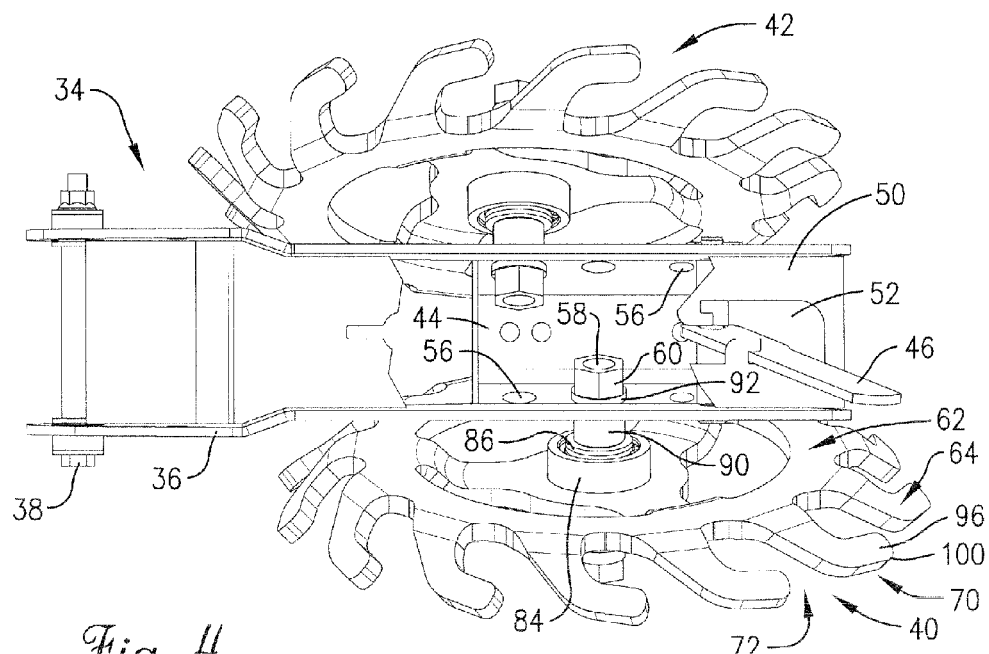
FIG. 4 is a top plan view of the apparatus.
Figure 5:
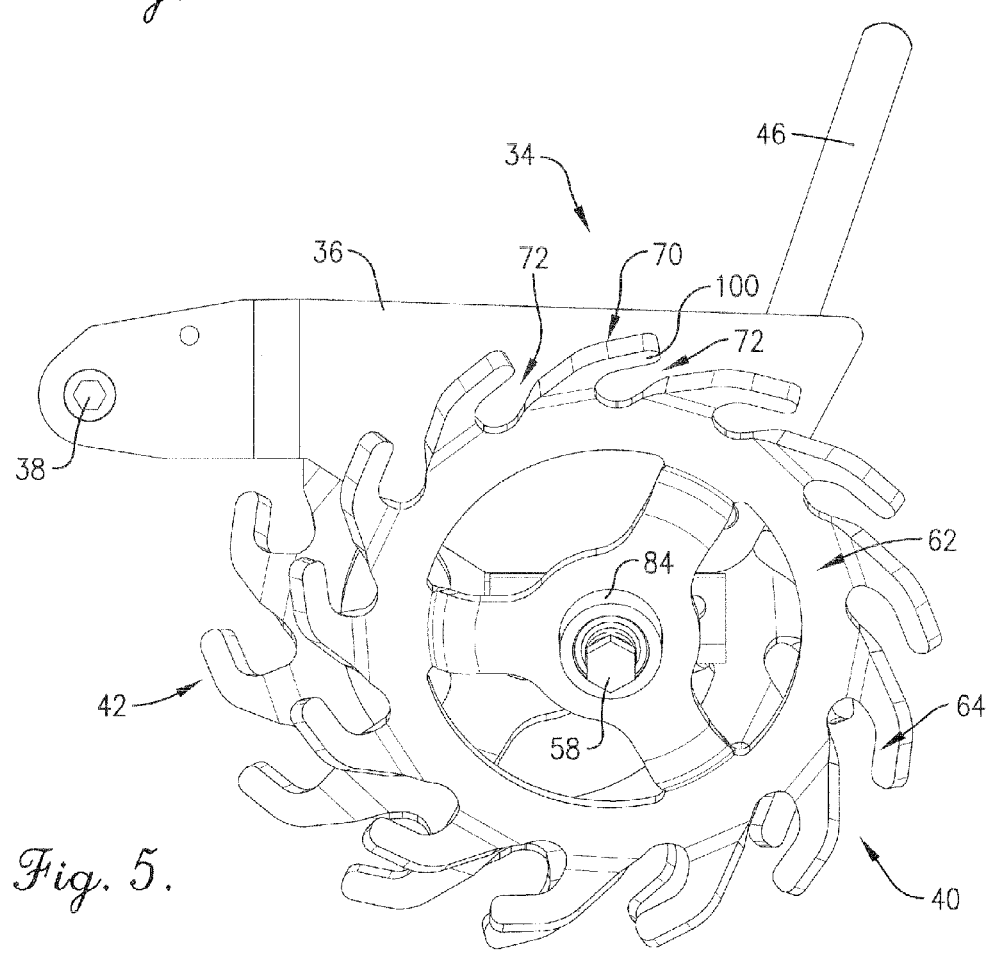
FIG. 5 is a left side elevational view of the apparatus.

As illustrated particularly in FIG. 4, support channel 44 has a series of mounting holes 56 in opposite lateral sidewalls thereof for the purpose of selectively receiving the spindle bolts 58 associated with the corresponding closing wheels 40, 42. Each spindle bolt 58 is retained in place by a nut 60 on the threaded inboard end thereof, which nut 60 can be unscrewed to release the corresponding wheel and allow it to be selectively moved into a different fore-and-aft position utilizing a different mounting hole 56. In the illustrated embodiment, closing wheels 40, 42 are in a slightly mutually staggered relationship with the right closing wheel 42 located slightly ahead of left closing wheel 40. However, whether closing wheels 40, 42 are maintained in staggered relationship with one another or are positioned in directly opposite alignment with one another is a matter of user choice and does not impact the principles of the present invention.

The spindle bolts 58 define the axes of rotation of closing wheels 40, 42 and in the illustrated embodiment are downwardly inclined from a horizontal plane by about 20 degrees, although this is subject to variation and adjustment. Accordingly, the closing wheels 40, 42 of each row unit 14 are each laterally outwardly inclined away from a vertical plane by about 20 degrees and converge downwardly and laterally inwardly toward one another. The angle of incline of one of the two closing wheels may be different from that of the other, if desired. Regardless, closing wheels 40, 42 are mutually spaced apart along their lower extremities so as to engage and penetrate the ground laterally outboard of opposite sides of the seed furrow as hereinafter described in more detail. Generally speaking, the inclined planes of rotation of the two closing wheels 40, 42 do not converge toward one another at the front or rear extremities of the wheels, although this can vary depending upon the depth of penetration of the wheels and the vertical position of box frame 36 about pivot bolt 38.

Left and right closing wheels 40, 42 are mirror images of one another. Thus, for the sake of efficiency, only the left closing wheel 40 will be described in detail in the description that follows, with the understanding that the same explanation applies equally to right closing wheel 42, but in a mirror image sense.

As illustrated particularly in FIGS. 6-9, closing wheel 40 comprises a generally dish-shaped metal body defined by a circular central portion 62 and a circumferentially extending, notched peripheral flange portion 64 that circumscribes central portion 62 and projects obliquely out of the plane thereof. As a consequence of its dish shape, wheel 40 presents a generally concave front (outer) side 66 and a generally convex back (inner) side 68. Notches 72 in flange portion 64 render flange portion circumferentially discontinuous or segmented and cause the presentation of a series of circumferentially spaced, obliquely projecting teeth 70 that are separated by the notches 72.

Central portion 62 has three generally trapezoidal-shaped open areas 74 that are equally spaced about the central axis of wheel 40 and which are separated by three spokes 76. Spokes 76 interconnect a radially outer, annular flat region 78 of central portion 62 with a smaller, radially inner, annular flat region 80. Inner region 80 extends generally parallel to outer region 78 but in laterally outwardly offset relation therewith, the spokes 76 being appropriately curved or bent out of the planes of the two regions 78, 80 to accommodate the offset relationship. As may be seen viewing FIG. 8, inner flat region 80 is offset from outer flat region 78 by an amount that is somewhat less than the extent to which flange portion 64 and teeth 70 project obliquely outward in the axial direction from outer region 78. Thus, teeth 70 project obliquely outwardly beyond inner flat region 80.

Inner flat region 80 has a central hole 82 therethrough (FIG. 8) that receives a cylindrical hub 84. Hub 84 is rigidly affixed to flat region 80 as by welding and projects in opposite directions outwardly beyond region 80. A bearing assembly 86 is retained within hub 84 and has a central bore 88 therethrough that receives spindle bolt 58. As may be seen in FIG. 4, when wheel 40 is mounted on support channel 44, a sleeve 90 is clamped between bearing assembly 86 on the back side 68 of wheel 40 and the outside surface of the proximal sidewall of channel 44, the spindle bolt 58 passing through bearing assembly 86, sleeve 90 and the proximal sidewall of support channel 44 before receiving the nut 60 on the distal end of spindle bolt 58. A lock washer 92 (FIG. 4) may be utilized beneath nut 60 if desired.

Flange portion 64 joins outer flat region 78 at an outwardly curved transition zone 94. Although transition zone 94 is curved, beyond that point to the outermost extremity of flange portion 64, flange portion 64 is flat. In the illustrated embodiment, the angle of oblique outturn of flange portion 64 relative to outer flat region 78 is on the order of thirty-five degrees, although that value may be greater or smaller to some extent. As a result of the flat nature of flange portion 64, all of the teeth 70 present flat back side surfaces 96 that serve as wedging and soil fracturing surfaces during operation as hereinafter described in more detail.

Each tooth 70 curves outwardly and rearwardly from central portion 62 with respect to the normal direction of rotation of wheel 40, which is counterclockwise viewing left closing wheel 40 in FIG. 6. A base portion 98 of each tooth begins at the outer extremity of transition zone 94 and tapers toward a reduced width as its outer end is approached. At the outer extremity of base portion 98, tooth 70 turns more sharply rearwardly and presents a foot 100 that is integrally joined with base portion 98. Foot 100 maintains a constant width from its intersection with base portion 98 to its rearmost tip 102, which is gently convexly rounded. As a result of this configuration, each tooth 70 presents a generally convexly curved leading edge 104 and a generally concavely curved trailing edge 106, such edges on adjacent ones of the teeth 70 serving to define the boundaries of notches 72.

FIG. 10 illustrates that one way of constructing wheel 40 is to initially cut the wheel body out of flat plate material having uniform thickness throughout the entirety of the body so as to produce a wheel blank 108. Thereafter, blank 108 can be placed within a forming die (not shown) and subjected to appropriate pressures to raise inner flat region 80 up out of the plane of outer flat region 78 and to bend flange portion 64 obliquely out of the plane of central portion 62. Alternatively, wheel 40 may be produced using a molding or casting technique. While in a preferred embodiment wheel 40 is constructed from metal, other suitable materials such as a synthetic resinous material might be utilized.

Operation

Figure 12:
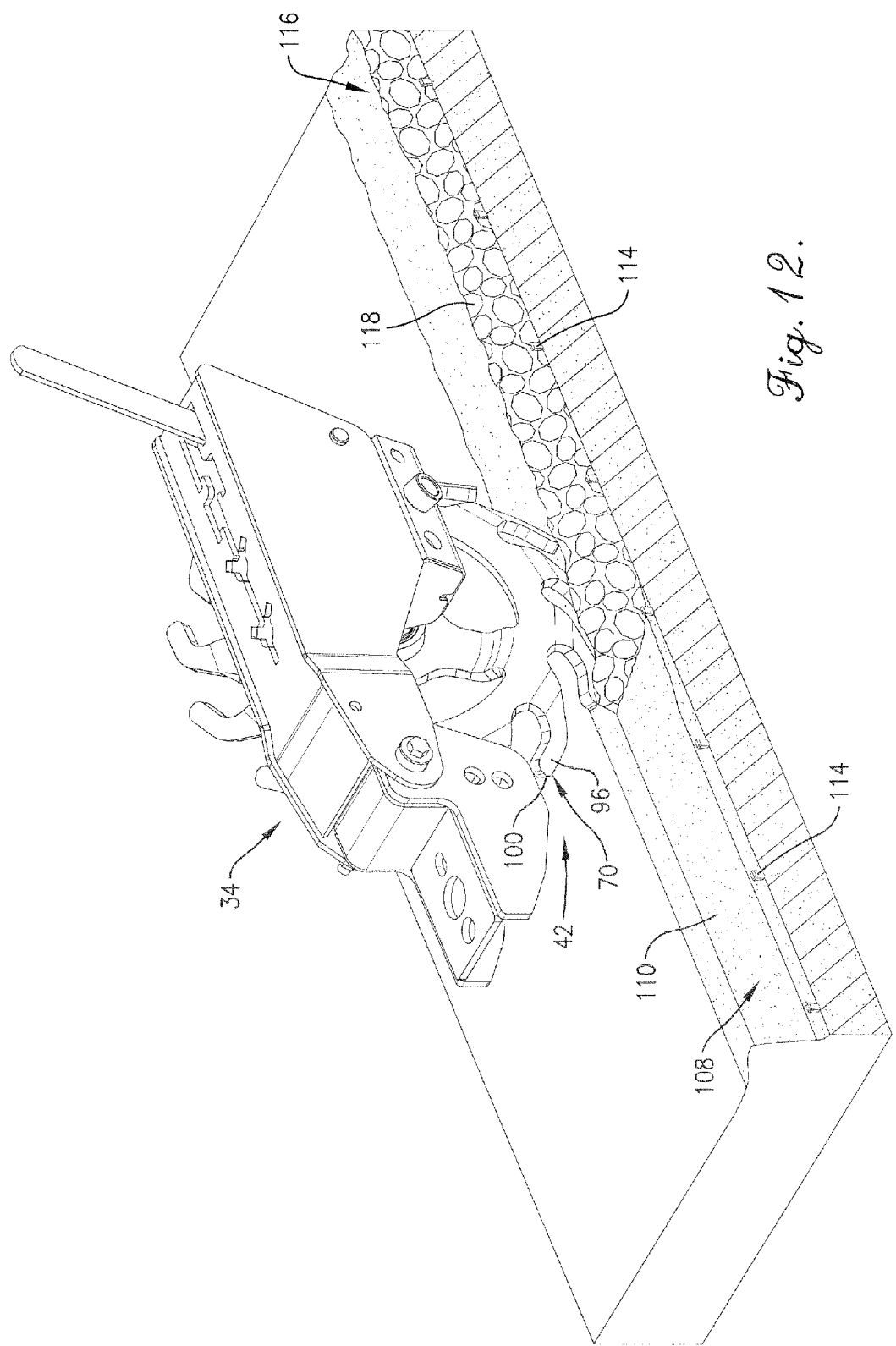
FIG. 12 is a view similar to FIG. 11 but with the near closing wheel removed and the closed seed furrow shown in cross section to illustrate the crumbled nature of the furrow sidewalls.

The closing action of wheels 40, 42 is illustrated particularly in FIGS. 11-18, although it may also be helpful to refer to various other figures. As illustrated in FIGS. 11 and 12, the two wheels 40, 42 engage the soil on opposite sides of and laterally outboard of the seed furrow 108. Seed furrow 108 has a generally V-shaped cross-section (see also FIG. 14), having a pair of downwardly converging, opposite sidewalls 110 and 112. Ideally, seed 114 is located at the bottom of furrow 108. Preferably, closing wheels 40, 42 are set to penetrate the soil only to the depth of outer flat region 78 along the lower extremity of the wheels. Thus, teeth 70 are normally well above the seeds 114, even at the lowermost, six o'clock positions of the wheels.

As the row units advance, engagement of wheels 40, 42 with the ground causes them to be rotated in a counterclockwise direction as viewed from the left side of the machine. As the teeth 70 rotate down into the soil at the lower front extremities of the wheels 40, 42, the flat back surfaces 96 of feet 100 impact the soil outside of furrow 100 and shove it inwardly toward the center, causing the furrow sidewalls 110, 112 to crumble and fragmentize. This fragmenting action occurs in part because teeth 70 represent a series of separate and distinct impacting structures, rather than a continuous surface such as would be the case if flange portion 64 were not notched. As a result, the integrity of furrow sidewalls 110, 112 is significantly destroyed, leaving a trail 116 of crumbled soil behind wheels 40, 42 without well-defined furrow sidewalls. FIG. 12 illustrates how the trail 116 comprises crumbled soil particles 118 after the passage of wheels 40, 42.

Figure 13:
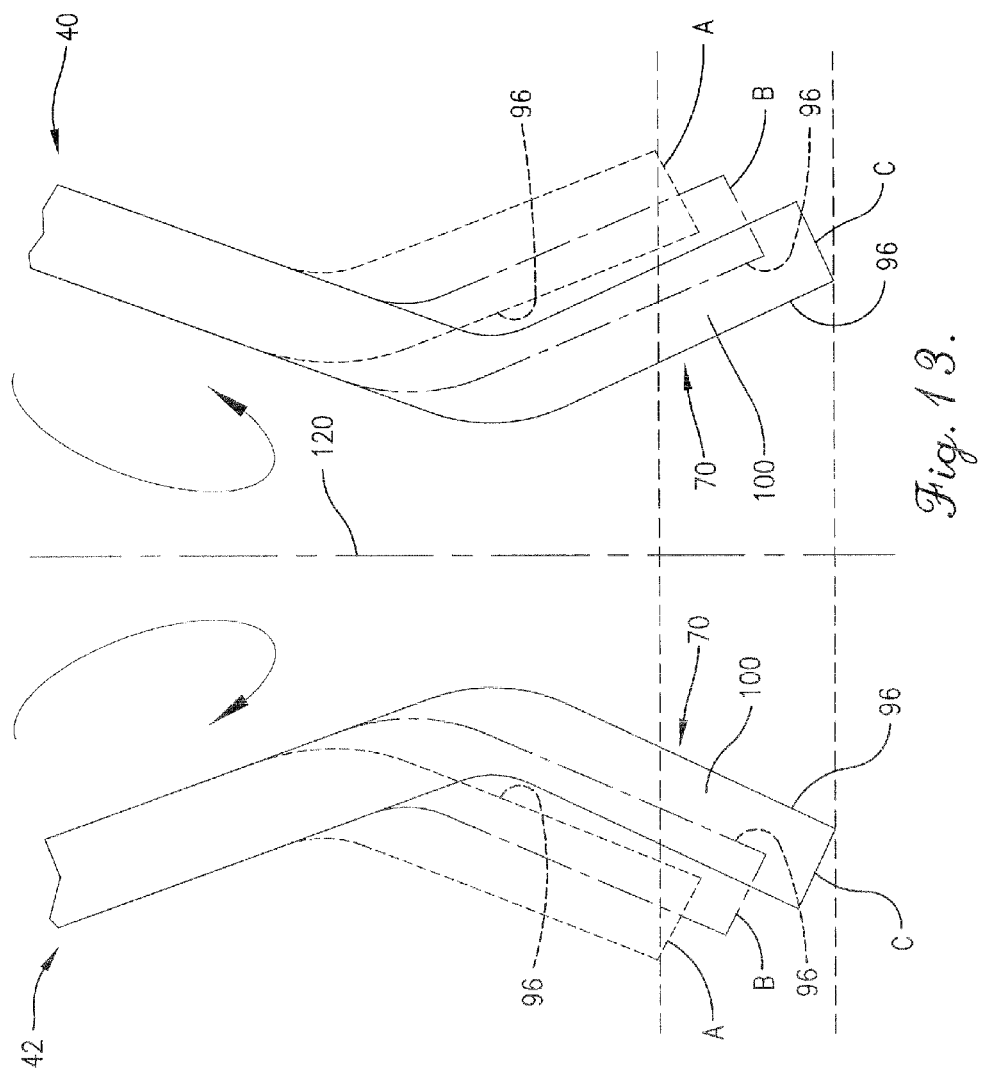
FIG. 13 is a schematic, fragmentary illustration of the way in which working surfaces on the oblique teeth of opposed closing wheels are caused to converge progressively closer to the center line of the seed furrow in a squeezing action as the rotating wheels engage the soil at their lower front extremities during operation, the phantom line positions denoting shallower, more outboard positions of the teeth as they enter the soil and the solid line positions denoting the deepest, most inboard positions of the teeth at the bottom of the rotating wheels.

In addition to fragmentizing the sidewalls of the seed furrow, closing wheels 40, 42 function to squeeze the sidewalls together. In this respect, FIG. 13 illustrates that as teeth 70 of wheels 40, 42 rotate progressively more deeply down into the soil, the flat back side surfaces 96 of feet 100 on opposite sides of the seed furrow move progressively closer and closer to one another so as to impart a squeezing action on the sidewalls from laterally outside the sidewalls. Center line 120 in FIG. 13 represents the center line of the seed furrow 108, and designators A, B, and C represent progressively deeper and deeper positions of wheel teeth 70 on opposite sides of the seed furrow.

Phantom line position A depicts the position of teeth 70 when they are just starting to enter the soil at the lower front extremities of wheels 40, 42. Back side surfaces 96 are significantly spaced away from center line 120 at this time. However, as teeth 70 penetrate deeper into the soil to position B, surfaces 96 move in closer together, and by the time the final position C is achieved at the six o'clock position of the wheels, surfaces 96 have moved inwardly toward center line 120 a substantial amount from position A. Such inward movement causes the flat back side surfaces 96 of feet 100 to cooperatively serve as wedging surfaces and apply a progressive squeezing action against opposite, outboard sides of the furrow sidewalls.

Figure 14:
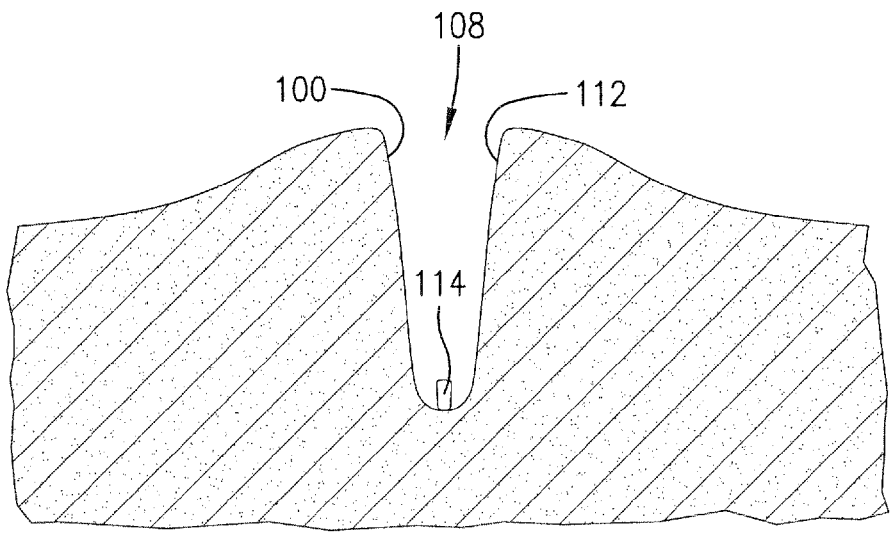
FIGS. 14-18 are schematic illustrations, taken in a transverse cross-sectional sense across the seed furrow, illustrating the manner in which the closing wheels squeeze and fragmentize the defined sidewalls of the furrow as the teeth on the wheels progressively rotate down into the soil during the closing action.
Figure 15:
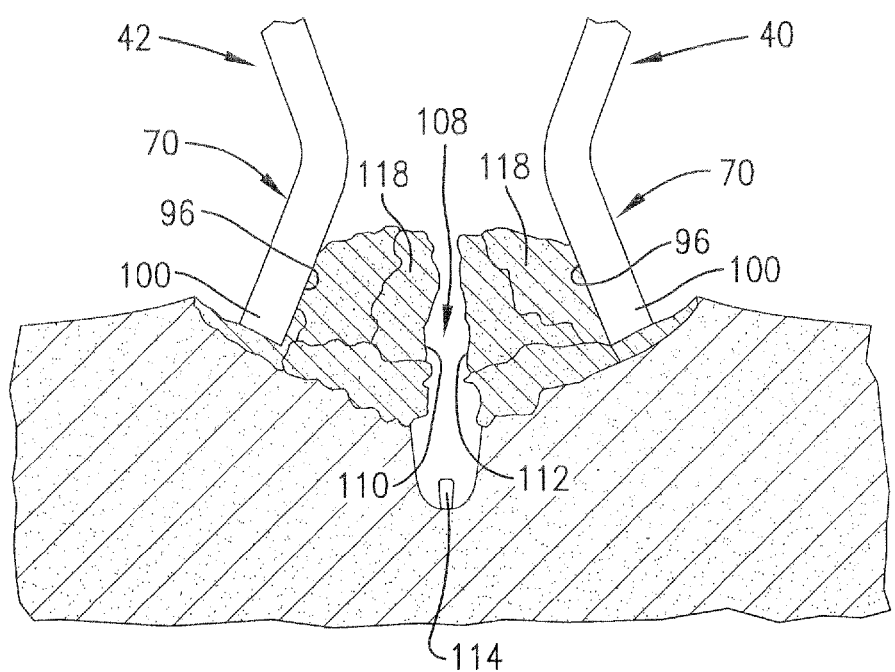
Figure 16:
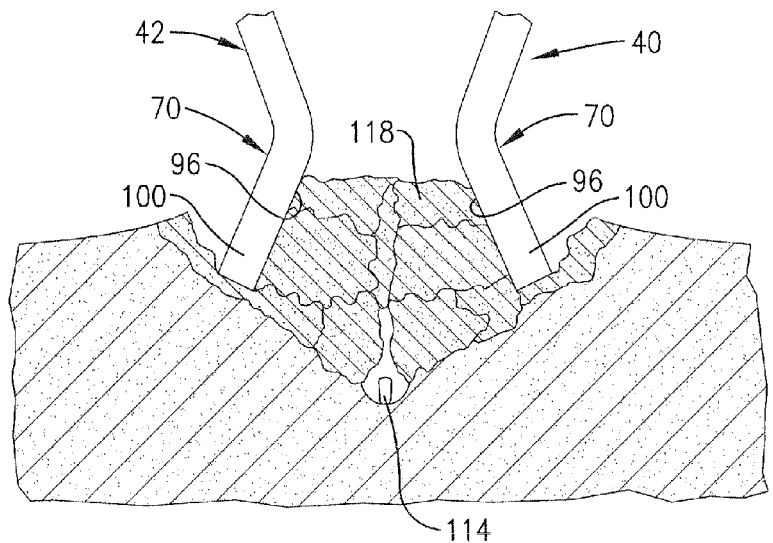
Figure 17:
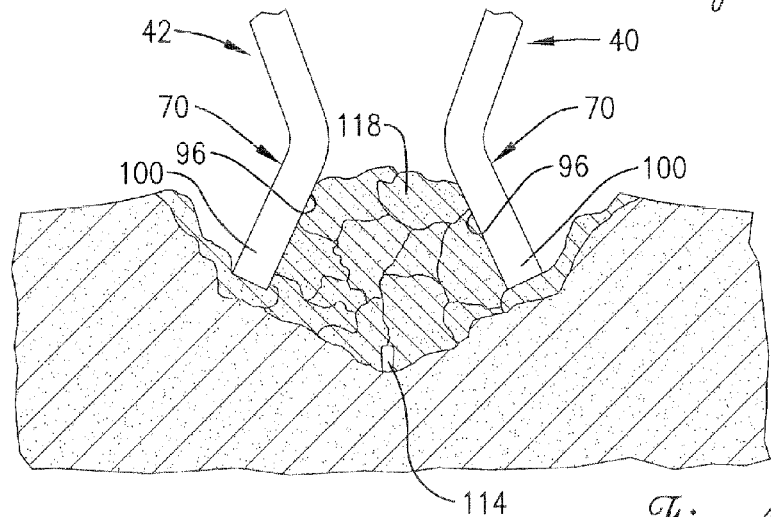
Figure 18:
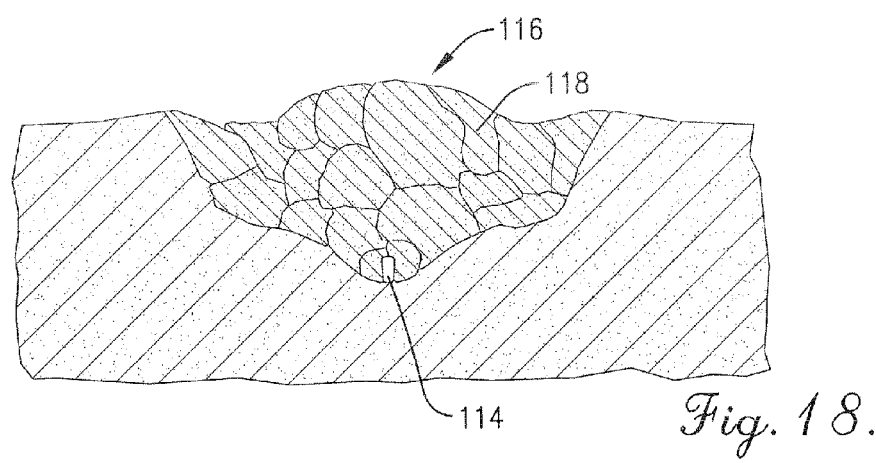

The combined squeezing and fragmentizing action of wheels 40, 42 is also illustrated schematically in FIGS. 14-18. In FIG. 14, teeth 70 of the opposed wheels 40, 42 have not yet engaged the soil, and thus seed furrow 108 is fully intact. By FIG. 15, however, teeth 70 have engaged the soil outboard of the opposite furrow sidewalls 110, 112 and have begun breaking up the soil and squeezing it inwardly with the flat back side surfaces 96 of feet 100. Crumbles and small clods 118 are beginning to form around and above seed 114. By FIGS. 16 and 17, the flat back side surfaces 96 of feet 100 have significantly broken up the furrow sidewalls into particles 118, squeezing them together and fully and firmly covering the seeds 114. After wheels 40, 42 exit the soil, the trail 116 of crumbled soil without a defined furrow slit is left behind, as illustrated in FIG. 18.

It is important to note that although teeth 70 do penetrate into the soil during the furrow closing action, they do not penetrate to the depth of the seed deposit. In this respect it will be noted that the flat feet 100 on teeth 70 tend to provide somewhat of a "floating" action for wheels 40, 42 to prevent untoward penetration into the soil. Instead of sharp teeth that penetrate and dig deeply into the soil, feet 100 present substantial flat impact surfaces with fairly wide "footprints" that resist excessive penetration. At the same time, the feet 100 perform their soil pushing and squeezing action to close the furrow and fragment the sidewalls thereof. Consequently, the deposited seeds are not disturbed or flipped out of the seed furrow as has been possible with aggressive conventional spiked wheels. Even without deep penetration, the wheels of the present invention are fully capable of not only closing the seed furrow, but also crumbling its sidewalls so as to avoid leaving a defined slit that can reopen as the soil dries out.

The non-radial, rearwardly raked attitude of teeth 70 with respect to the normal direction of rotation of wheels 40, 42, is helpful in causing wheels 40, 42 to be substantially self-cleaning during use. To this end, teeth 70 tend to lift up out of the soil generally vertically along the trailing extremities of wheels 40, 42 such that clods and trash are easily released by teeth 70. Teeth that project radially on conventional closing wheels tend to accumulate clods and trash, lifting the same up out of the soil horizontally along the trailing side of the wheels.

It will be appreciated that there may be times when only one of the wheels 40, 42 is selected for use, the other side of the row unit simply being devoid of any wheel or perhaps having a "solid" wheel in place. Even using just one of the footed wheels in accordance with the present invention is helpful, although a pair of such wheels for each row unit usually works best.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A seed furrow closing wheel comprising:
a generally dish-shaped body having a central portion and a circumferentially extending, peripheral flange portion that projects obliquely outwardly away from said central portion,
said flange portion being circumferentially notched to present a series of circumferentially spaced, obliquely projecting teeth, said teeth curving rearwardly with respect to the normal direction of rotation of the wheel,
said body having a generally concave front side and a generally convex back side,
the back sides of said teeth presenting a series of wedge surfaces for use in displacing and fragmenting a sidewall of the furrow as the wheel rotates down into the ground during use.

2. A closing wheel as claimed in claim 1, each of said teeth including a base portion and a rearwardly turned, outermost foot portion.

3. A closing wheel as claimed in claim 2, said base portion tapering in width as the foot portion is approached, said foot portion being of generally constant width.

4. A closing wheel as claimed in claim 3, the rearmost tip of each foot portion with respect to the normal direction of rotation of the wheel being convexly rounded.

5. A closing wheel as claimed in claim 1, said body being constructed of plate material having a uniform thickness throughout the entirety of the body.

6. A closing wheel as claimed in claim 1, said body being constructed from plate material that is cut to present said teeth and formed out of an initially flat plane to render the body generally dish-shaped.

7. A closing wheel as claimed in claim 1, said body being constructed from cast material.

8. A closing wheel as claimed in claim 1, wherein said generally dish-shaped body has a substantially uniform thickness throughout the entirety of the body.

9. A closing wheel as claimed in claim 1, wherein each of said teeth comprises a backside surface, a frontside surface, and an edge surface extending between said backside and frontside surfaces, wherein said edge surface joins said backside surface and said frontside surface at substantially right angles.

10. A closing wheel as claimed in claim 1, wherein all of said teeth extend away from said generally convex backside.

11. A seed furrow closing assembly comprising:
a pair of furrow closing wheels, each comprising
a generally dish-shaped body having a central portion and a circumferentially extending, peripheral flange portion that projects obliquely outwardly away from said central portion,
said flange portion being circumferentially notched to present a series of circumferentially spaced, obliquely projecting teeth,
said body having a generally concave front side and a generally convex back side,
the back sides of said teeth presenting a series of wedge surfaces for use in displacing and fragmenting a sidewall of the furrow as the wheel rotates down into the ground during use,
said closing wheels being oriented such that the convex back sides of said wheels face each other.

12. A seed furrow closing assembly as claimed in claim 11, said closing wheels being rotatable in inclined planes that converge downwardly and inwardly toward one another as the lower extremities of the wheels are approached.

13. A seed furrow closing assembly as claimed in claim 11, said teeth of each wheel curving outwardly and rearwardly from the central portion with respect to the normal direction of rotation of the wheels so that notches between the teeth open in a generally outward and rearward direction with respect to the normal direction of rotation of the wheels.

14. A seed furrow closing assembly as claimed in claim 13, each of said teeth including a base portion and a rearwardly turned, outermost foot portion.

15. A seed furrow closing assembly as claimed in claim 14, said base portion tapering in width as the foot portion is approached, said foot portion being of generally constant width.

16. A seed furrow closing assembly as claimed in claim 11, wherein said generally dish-shaped body has a substantially uniform thickness throughout the entirety of the body.

17. A seed furrow closing assembly as claimed in claim 11, wherein each of said teeth comprises a backside surface, a frontside surface, and an edge surface extending between said backside and frontside surfaces, wherein said edge surface joins said backside surface and said frontside surface at substantially right angles.

* * * * *